United States Patent
Omatsu et al.

(10) Patent No.: US 9,172,205 B2
(45) Date of Patent: Oct. 27, 2015

(54) METHOD FOR OSCILLATING AN OPTICAL VORTEX LASER AND OPTICAL VORTEX LASER OSCILLATION DEVICE

(75) Inventors: Takashige Omatsu, Chiba (JP);
Katsuhiko Miyamoto, Chiba (JP)

(73) Assignee: NATIONAL UNIVERSITY CORPORATION CHIBA UNIVERSITY, Chiba-shi, Chiba (JP)

( * ) Notice: Subject to any disclaimer, the term of this patent is extended or adjusted under 35 U.S.C. 154(b) by 149 days.

(21) Appl. No.: 14/124,409

(22) PCT Filed: Jun. 7, 2012

(86) PCT No.: PCT/JP2012/064663
§ 371 (c)(1),
(2), (4) Date: Feb. 5, 2014

(87) PCT Pub. No.: WO2012/169578
PCT Pub. Date: Dec. 13, 2012

(65) Prior Publication Data
US 2014/0226685 A1  Aug. 14, 2014

(30) Foreign Application Priority Data

Jun. 7, 2011  (JP) ................................. 2011-127356

(51) Int. Cl.
| | |
|---|---|
| *G02F 1/35* | (2006.01) |
| *H01S 3/108* | (2006.01) |
| *G02F 1/39* | (2006.01) |
| *H01S 3/00* | (2006.01) |

(52) U.S. Cl.
CPC ................ *H01S 3/1083* (2013.01); *G02F 1/39* (2013.01); *G02F 2202/20* (2013.01); *H01S 3/0092* (2013.01)

(58) Field of Classification Search
None
See application file for complete search history.

(56) References Cited

U.S. PATENT DOCUMENTS

| | | | |
|---|---|---|---|
| 7,050,469 B1 * | 5/2006 | Lundquist et al. | 372/9 |
| 2007/0035810 A1 * | 2/2007 | Henderson | 359/330 |

OTHER PUBLICATIONS

"Power scaling of a picosecond vortex laser based on a stressed Yb-doped fiber amplifier", by M. Koyama et al, Optics Express, vol. 19, No. 2, 2011, pp. 994-999.

(Continued)

*Primary Examiner* — Hemang Sanghavi
(74) *Attorney, Agent, or Firm* — Flynn, Thiel, Boutell & Tanis, P.C.

(57) ABSTRACT

Provided is an optical vortex laser oscillation device which is capable of an increased out and can generate an optical vortex even in a wide frequency range and if the optical vortex has a quantum number which is not an integer. A laser device according to one embodiment of the present application comprises: a laser light source for generating laser light; an optical vortex generation unit for generating an energized optical vortex on the basis of the laser light generated by the laser light source; and an optical resonance unit for resonating the energized optical vortex generated by the optical vortex generation unit and dividing the energized optical vortex into signal light and idler light. Therein, it is preferable that the optical resonance unit comprises a non-liner medium and a pair of resonator mirrors sandwiching the non-linear medium, and it is preferable that the non-linear medium includes at least one among $KTiOPO_4$, periodically polarization-reversed $LiNbO_3$, and periodically polarization-reversed $LiTaO_3$.

27 Claims, 20 Drawing Sheets

(56) References Cited

OTHER PUBLICATIONS

"High power vortex output from a side-diode-pumped $Nd^{3+}$ vanadate compact bounce laser", by K. Iwamatsu et al, Japan Society of Applied Physics, 16a-ZG-6, 2010, p. 04-111, with English translation.
International Search Report of PCT/JP2012/064663 (2 pages).

* cited by examiner

METHOD FOR OSCILLATING AN OPTICAL VORTEX LASER AND OPTICAL VORTEX LASER OSCILLATION DEVICE

TECHNICAL FIELD

The present invention relates to a method for oscillating an optical vortex laser and an optical vortex oscillation device.

BACKGROUND ART

An optical vortex is a light wave that is characterized by angular momentum (orbital angular momentum) originates from phase singular point and doughnut-type intensity distribution.

A representative example of an optical vortex may be Laguerre Gaussian Beam (for example, see non-patent literature described below). Laguerre Gaussian Beam is eigensolution of wave equation in cylindrical coordinate system and satisfies a periodic boundary condition in which phase rotates only integral multiplication of $2\pi$ in every one wavelength propagation around center of rotation. Thus, it is possible to express size of orbital angular momentum by using L (L=1, 2, 3, etc.) of quantum number. Wave front of an optical vortex has a helical shape. Orbital angular momentum operates on a direction given by vector difference between a normal direction thereof and a light propagation direction.

Furthermore, an optical vortex can be employed for light manipulation using radiation pressure of light, a high resolution microscope using phase singular point, optical vortex ablation processing positively using orbital angular momentum, and future industrial applications thereof are largely expected.

Exemplary methods for generating an optical vortex include: (1) a method using a bounce cavity (for example, non-patent literature 2 described below), (2) a method using a multi-mode area fiber amplifier (for example, non-patent literature 3 described below), (3) a method using a phase plate (for example, non-patent literature 4), and (4) a method using a space phase modulator (for example, non-patent literature 5).

RELATED ART REFERENCE

Non-Patent Reference

Non-patent literature 1: L. Allen, M. W. Beijersbergen, R. J. C. Spreeuw, and J. P. Woerdman, "Orbital angular momentum of light and the transformation of Laguerre-Gaussian laser modes," Phys. Rev. A45, 8185-8189 (1992).

Non-patent literature 2: M. Okida, M. Itoh, T. Yatagai, and T. Omatsu, "Direct generation of high power Laguerre-Gaussian output from a diode-pumped Nd:YVO$_4$ 1.3-μm bounce laser," Optics Express, 15, 7616-7622 (2007).

Non-patent literature 3: Y. Tanaka, M. Okida, K. Miyamoto, and T. Omatsu, "High power picosecond vortex laser based on a large-mode-area fiber amplifier," Opt. Express 17, 14362-14366 (2009).

Non-patent literature 4: T. Omatsu, K. Chujo, K. Miyamoto, M. Okida, K. Nakamura, N. Aoki, and R. Morita, "Metal microneedle fabrication using twisted light with spin," Opt. Express, 18, 17967-17973 (2010).

Non-patent literature 5: N. R. Heckenberg, R. McDuff, C. P. Smith, and A. G. White, "Generation of optical phase singularities by computer-generated holograms," Opt. Lett. 17, 221-223 (1992).

DESCRIPTION OF THE INVENTION

Problems to be Solved by the Invention

However, in the methods of (1) and (2), quantum number of an optical vortex which can be generated is limited to low dimensions such as +1, −1, and the like. Furthermore, the quantum number is only an integer.

Moreover, in the methods of (3) and (4), passive methods are fundamentally employed. There is a problem of obtaining high power because an optical vortex can be generated only in a specific wavelength and optical loss is caused by an element.

Thus, it is an object of the present invention to provide an optical vortex laser oscillation device which can have high power and can generate an optical vortex even in a wide frequency range and if the optical vortex has quantum number which is not an integer.

Means for Solving the Problems

In order to solve the above mentioned problem, a method for oscillating an optical vortex laser according to one aspect of the present invention is characterized by irradiating an optical vortex of pulse excitation into an optical parametric oscillation system, generating a plurality of coherent optical vortices, and varying quantum number of orbital angular momentum to perform frequency conversion.

In the method for oscillating an optical vortex laser according to one aspect of the present invention, an optical parametric oscillation system is not limited. However, the optical parametric oscillation system preferably comprises a resonator, wherein the resonator includes a non-linear medium and a pair of resonator mirrors sandwiching the non-linear medium.

In the method for oscillating an optical vortex laser according to one aspect of the present invention, radius of curvature for the resonator mirrors is not limited. However, the radius of curvature for the resonator mirrors is preferably five times greater than length of a resonator formed by the pair of resonator mirrors.

In the method for oscillating an optical vortex laser according to one aspect of the present invention, a pair of resonator mirrors is not limited. However, the pair of resonator mirrors is preferably a parallel flat plate.

The method for oscillating an optical vortex laser according to one aspect of the present invention is not limited. However, it is preferable to vary a degeneration state of quantum number of angular momentum by changing resonance condition in the resonator.

The method for oscillating an optical vortex laser according to one aspect of the present invention is not limited. However, the quantum number of orbital angular momentum is preferably a non-degenerate state.

The method for oscillating an optical vortex laser according to one aspect of the present invention is not limited. However, it is preferable to generate multi-frequency by generating a plurality of coherent optical vortices.

The method for oscillating an optical vortex laser according to one aspect of the present invention is not limited. However, it is preferable to generate difference frequency.

The method for oscillating an optical vortex laser according to one aspect of the present invention is not limited. However, it is preferable to rotate a non-linear medium.

The method for oscillating an optical vortex laser according to one aspect of the present invention is not limited. However, it is preferable to change temperature of the non-linear medium.

The method for oscillating an optical vortex laser according to one aspect of the present invention is not limited. However, the non-linear medium preferably includes at least any one of $KTiOPO_4$, periodically polarization-reversed $LiNbO_3$, and periodically polarization-reversed $LiTaO_3$.

An optical vortex laser oscillation device according to another aspect of the present invention is characterized by comprising: a laser light source for generating laser light of pulse excitation; an optical vortex generation unit for generating an excited optical vortex on the basis of the laser light generated by the laser light source; and an optical parametric oscillation system for generating a plurality of coherent optical vortices on the basis of the excited optical vortex generated by the optical vortex generation unit and changing quantum number of orbital angular momentum to perform frequency conversion.

In the optical vortex laser oscillation device according to another aspect of the present invention, a parametric oscillation system is not limited. However, the parametric oscillation system preferably comprises a non-linear medium and a pair of resonator mirrors sandwiching the non-linear medium.

In the optical vortex laser oscillation device according to another aspect of the present invention, radius curvature for the resonator mirrors is not limited. However, the radius of curvature for the resonator mirrors is preferably five times greater than length of a resonator formed by the pair of resonator mirrors.

In the optical vortex laser oscillation device according to another aspect of the present invention, a pair of resonator mirrors is not limited. However, the pair of resonator mirrors is preferably a parallel flat plate.

The optical vortex laser oscillation device according to another aspect of the present invention is not limited. However, it is preferable to vary a degeneration state of the quantum number of angular momentum by changing resonance condition in a resonator.

In the optical vortex laser oscillation device according to another aspect of the present invention, quantum number of orbital angular momentum is not limited. However, the quantum number of orbital angular momentum is preferably a non-degenerate state.

The optical vortex laser oscillation device according to another aspect of the present invention is not limited. However, it is preferable to generate multi-frequency by generating the plurality of coherent optical vortices.

The optical vortex laser oscillation device according to another aspect of the present invention is not limited. However, it is preferable to generate difference frequency.

The optical vortex laser oscillation device according to another aspect of the present invention is not limited. However, it is preferable to rotate the non-linear medium.

The optical vortex laser oscillation device according to another aspect of the present invention is not limited. However, it is preferable to change temperature of the non-linear medium.

In the optical vortex laser oscillation device according to another aspect of the present invention, a non-linear medium is not limited. However, the non-linear medium preferably includes at least any one of $KTiOPO_4$, periodically polarization-reversed $LiNbO_3$, and periodically polarization-reversed $LiTaO_3$.

An optical vortex laser oscillation device according to a third aspect of the present invention is characterized by comprising: a laser light source for generating laser light; an optical vortex generation unit for generating an excited optical vortex on the basis of the laser light generated by the laser light source; and an optical resonance unit for resonating the excited optical vortex generated by the optical vortex generation unit and dividing the excited optical vortex into signal light and idler light.

In the optical vortex laser oscillation device according to a third aspect of the present invention, the optical resonance unit is not limited. However, the optical resonance unit preferably includes a non-linear medium and a pair of resonator mirrors sandwiching the non-linear medium.

In the optical vortex laser oscillation device according to a third aspect of the present invention, radius of curvature for the resonator mirrors is not limited. However, the radius of curvature for the resonator mirrors is preferably five times greater than length of a resonator formed by the pair of resonator mirrors.

In the optical vortex laser oscillation device according to a third aspect of the present invention, a ratio of photon energy of idler light with respect to photon energy of signal light is not limited. However, the ratio is preferably 0.8 or more and 1.2 or less.

In the optical vortex laser oscillation device according to a third aspect of the present invention, the non-linear medium is not limited. However, the non-linear medium preferably includes at least any one of $KTiOPO_4$, periodically polarization-reversed $LiNbO_3$, and periodically polarization-reversed $LiTaO_3$.

Effects of the Invention

Hereinabove, the present invention provides an optical vortex oscillation device which can have high power, and can be operated even in a wide frequency range and if an optical vortex is quantum number which is not an integer.

BEST MODE FOR CARRYING OUT THE PRESENT INVENTION

Hereinafter, embodiments for carrying out the present invention are described in detail by drawings. However, the present invention may have several embodiments and may not be limited to embodiments and examples described below.

An optical vortex laser oscillation device (hereinafter, referred to as "the present laser device") according to the present embodiment comprises a laser light source for generating laser light of pulse excitation, an optical vortex generation unit for generating an excited optical vortex based on the laser light generated by the laser light source, and an optical parametric oscillation system for generating a plurality of coherent optical vortices based on the excited optical vortex generated by the optical vortex generation unit and varying quantum number of orbital angular momentum to perform frequency conversion.

The optical parametric oscillation system according to the present embodiment means an optical system that generates a plurality of coherent optical vortices based on the excited optical vortex generated by the optical vortex generation unit and that changes the quantum number of orbital angular momentum to perform frequency conversion. Configuration of the optical parametric oscillation system is not limited as far as its function is maintained. Specific example thereof may be an optical system that includes a pair of resonator mirrors and a medium sandwiched between the pair of resonator mirrors, i.e., an optical resonance unit. More specific example thereof is described below.

Figure 1:
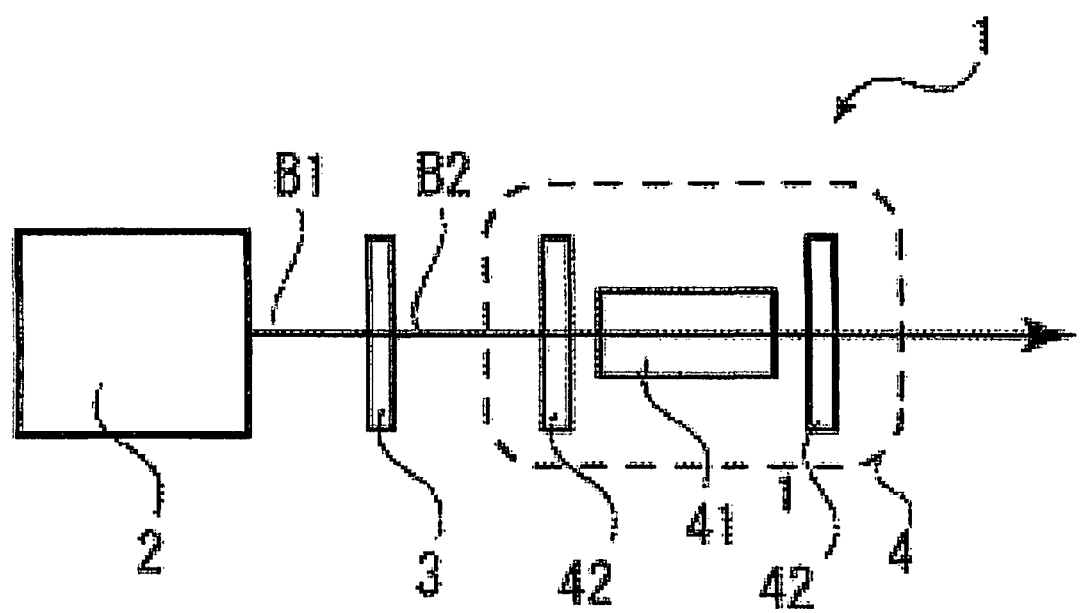
FIG. 1 is a schematic drawing of an optical vortex laser oscillation device according to an embodiment of the present invention.

FIG. 1 is a drawing that schematically shows an optical system of an optical vortex laser oscillation device (hereinafter, referred to as "the present laser device") according to the present embodiment. As shown in FIG. 1, the present laser device 1 includes a laser light source 2 for generating laser light B1, an optical vortex generation unit 3 for generating an excited optical vortex B2 based on the laser light B1 which the laser light source 2 generates, and an optical resonance unit 4 for resonating the excited optical vortex B2 which the optical vortex generation unit generates and for dividing the excited optical vortex B2 into signal light and idler light.

In the present embodiment, the laser light source 2 can generate the laser light B1 described above. The laser light source 2 is not limited as far as the above mentioned function is maintained. Examples thereof include a solid-state laser such as YAG laser, a dye laser, a gas laser such as He—Ne laser, a semiconductor laser such as LD laser, and the like.

Wavelength region of light emitted from the laser light source 2 in the present embodiment is preferably in the outside range of visible region. Wavelength region of emitted light is preferably 800 nm or more, and more preferably 1000 nm or more. Within this wavelength region, it is possible to obtain light from visible wavelength region to middle infrared region in the optical resonance unit 4.

Furthermore, in the present embodiment, the laser light source 2 is preferably a pulse oscillation laser light source for generating pulse laser light. The pulse oscillation laser light source has wider spectral width than a continuous oscillation laser light source. The pulse oscillation laser light source is applicable because it emits high power laser light. Coherent coupling is difficult to occur in the continuous oscillation laser light source, whereas coherent coupling is easy to occur in the pulse oscillation laser light source.

Furthermore, in the present embodiment, the optical vortex generation unit 3 can generate the excited optical vortex B2 based on the laser light B1 which the laser light source 2 generates. The optical vortex generation unit 3 is not limited and may use a phase plate, a space phase modulator, a multi-mode area fiber amplifier, or the like. Furthermore, configuration in which the laser light source 2 and the optical vortex generation unit 3 are directly united to generate an optical vortex may be employed. The optical vortex generated by the optical vortex generation unit 3 is more preferably a coherent optical vortex.

Furthermore, in the present embodiment, the optical resonance unit 4 can resonate the excited optical vortex B2 generated by the optical vortex generation unit and generate a plurality of coherent optical vortices, and change quantum number of orbital angular momentum to perform frequency conversion. Specifically, it is possible to divide into signal light and idler light. Furthermore, an optical vortex generated from an optical parametric oscillation system (an optical resonance unit) according to the present embodiment can arbitrarily change quantum number of starting angular momentum by varying resonance condition, thereby enabling the plurality of quantum number of light to be a degenerate state, and also to be a non-degenerate state.

In the present embodiment, the optical resonance unit 4 is not limited. For example, the optical resonance unit 4 preferably includes a non-linear medium 41 and a pair of resonator mirrors 42 sandwiching the non-linear medium 41.

In the present embodiment, wavelength of light emitted from the optical resonance unit 4 is not limited. Light having from visible wavelength region to middle infrared region (wavelength region having 360 nm or more and 4 μm or less) is preferable. Wavelength variable region thereof is preferably 1.5 times greater than and 2.5 times less than wavelength of the excited optical vortex, more preferably 1.8 times greater than and 2.2 times less than wavelength of the excited optical vortex. Wavelength of light emitted from the optical resonance unit 4 may be the same or different from one another. In the case where the wavelength of light is different from one another, multi-frequency occurs and thus difference frequency can be generated.

In the present embodiment, the non-linear medium 41 is used for adjusting optical path length in the resonator, and not limited as far as function thereof is maintained. For example, the non-linear medium 41 preferably includes at least any one of $KTiOPO_4$, periodically polarization-reversed $LiNbO_3$, and periodically polarization-reversed $LiTaO_3$.

In the present embodiment, the pair of mirrors 42 in which emitted light is partially transmitted and emitted light is partially reflected is designed to have high reflectivity in opposite surfaces. Light is confined with high reflectivity by reflection of light, thereby performing resonance of light.

In the present embodiment, configuration of the pair of resonator mirrors 42 is not limited as far as the above mentioned condition is maintained, and may have mirrors in which opposite surfaces are concave surfaces, one of the pair of resonator mirrors 42 is flat surface, or the pair of resonator mirrors 42 is a flat surface (i.e., parallel plate). In the case where concave surface is employed in the pair of resonator mirrors 42, radius of curvature thereof needs not to rotate Gouy phase and preferably sufficiently longer than resonance length formed by the pair of resonator mirrors 42. The radius of curvature is preferably at least 5 times larger than the resonance length, and more preferably 10 times larger than the resonance length.

In the present embodiment, sum of energy of the excited optical vortex B2 and energies of signal light and idler light is equal to sum of momentum of the excited optical vortex B2 and momentums of signal light and idler light. Thus, the excited optical vortex can be divided into signal light and idler light. Herein, "equal" means complete matching and covers errors in experimental measurement or in setting of device. For example, equal includes errors having 2% or less in energy and momentum.

In the present embodiment, a ratio of photon energy of idler light with respect to photon energy of signal light is 0.8 or more and 1.2 or less. Quantum numbers of signal light and idler light are divided so as to be within this range. For example, when quantum number of the excited optical vortex is two and photon energy of signal light is equal to photon energy of idler light, quantum numbers of signal light and idler light are identical and become one.

In the present embodiment, distance between the pair of resonator mirrors 42 is not limited as far as it has sufficient length which is capable of sandwiching the non-linear medium and Gouy phase is not inverted. The distance thereof is preferably 3 cm or more and 10 cm or less.

A laser oscillation device according to the present embodiment can change a state of emitted light by properly adjusting resonance condition of the optical resonator 4. For example, the adjusting methods include modifications of the distance between the pair of resonator mirrors 42, radius of curvature for at least one resonator, and material, temperature, direction (i.e., rotation position), and the like of the non-linear medium formed between the pair of resonator mirrors 42.

Furthermore, as clearly shown in the above mentioned configuration, provided is a laser generation method that generates an modulated optical vortex by configuring an optical vortex laser oscillation device according to the present embodiment, for example, by irradiating an optical vortex of pulse excitation into an optical parametric oscillation system, generating a plurality of coherent optical vortices, and changing quantum number of orbital angular momentum to perform frequency conversion, more specifically by generating laser light, generating an excited optical vortex based on the generated laser light, and resonating the excited optical vortex.

Hereinabove, the optical vortex oscillation device according to the present embodiment can have a high power and generate an optical vortex that divides quantum number into a wide range of frequency.

EXAMPLES

Herein, an optical vortex laser oscillation device according to the embodiment described above was fabricated and effects thereof were confirmed. Hereinafter, details are described.

Example 1

Figure 2:
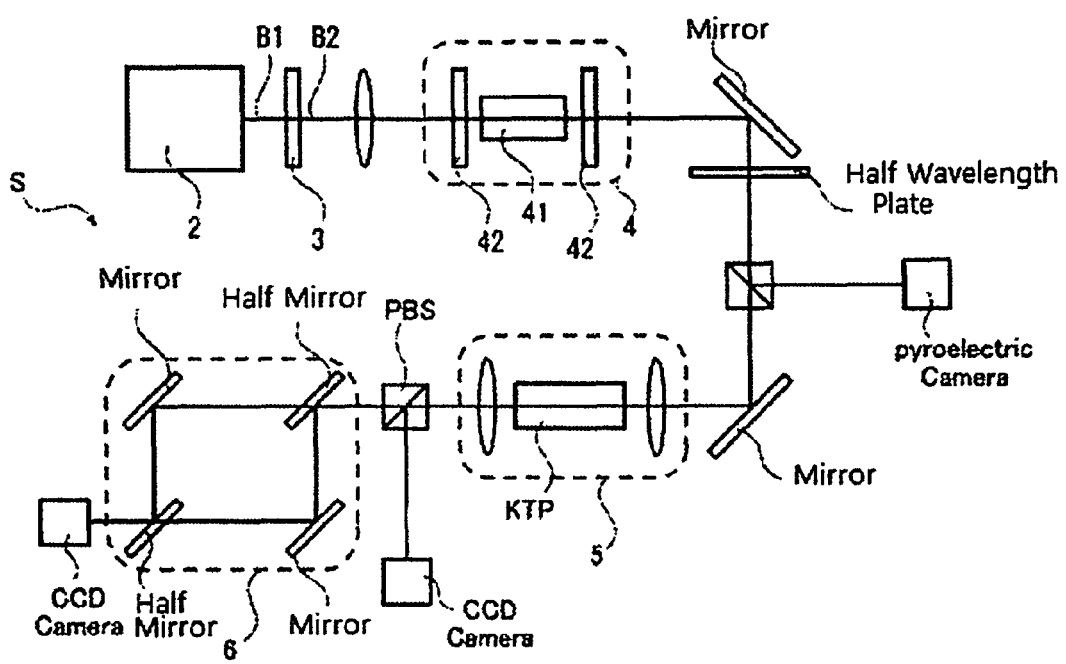
FIG. 2 is a drawing that schematically shows optical system for experiment according to an example of the present invention.

FIG. 2 is a drawing that shows optical system for experiment according to the example 1. In the example 1, the configuration described in the above mentioned embodiment further includes experimental system for confirming quantum number of emitted light and the like.

As shown in FIG. 2, the present experimental optical system S includes a laser light source 2 for generating laser light B1, an optical vortex generation unit 3 for generating an excited optical vortex based on the laser light B1 which the laser light source 2 generates, and an optical resonance unit 4 for resonating the excited optical vortex B2 which the optical vortex generation unit 3 generates and dividing the excited optical vortex B2 into signal light and idler light.

As the laser light source 2 in the example 1, Nd:YAG (Lotis SL-2136, 1064 nm of wavelength, 40 ns of pulse width, 50 Hz of repetition speed) was used.

Figure 3:
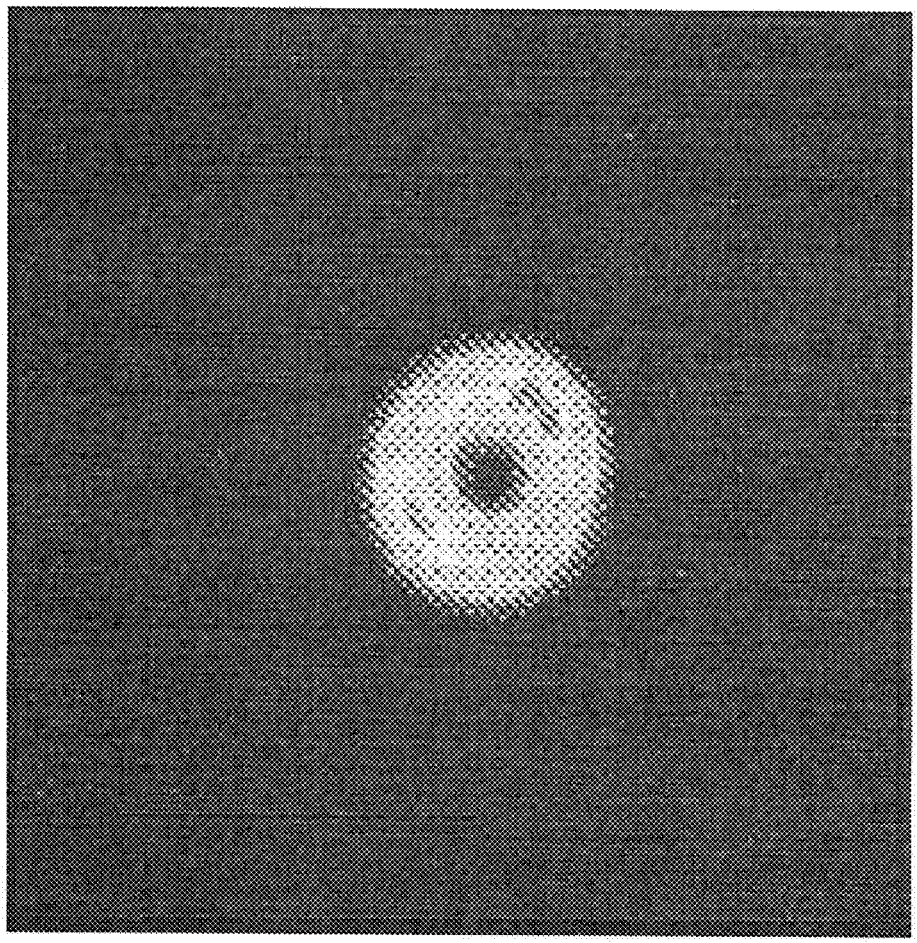
FIG. 3 is a drawing that shows a space profile for an excited optical vortex (L=1) according to example 1.

Furthermore, in the example 1, a helical phase plate was used for the optical vortex generation unit 3 and was configured to generate an excited optical vortex of quantum number of L=1. In the FIG. 3, a space profile of the excited optical vortex in this state is shown.

Furthermore, in the example 1, a first plane reflection mirror (98% of reflectance for 2 μm and 90% of transmittance for 1 μm) and a second plane reflection mirror (100% of transmittance for 2 μm and 80% of reflectance for 1 μm) were used for the optical resonance unit 4. The optical resonance unit 4 is configured that the distance (i.e., resonator length) between the first plane reflection mirror and the second reflection mirror was 5 cm and that $KTiOPO_4$ ($\theta$=51.4° of a non-linear medium with 5 mm×5 mm×30 mm was formed therebetween.

Figure 4:
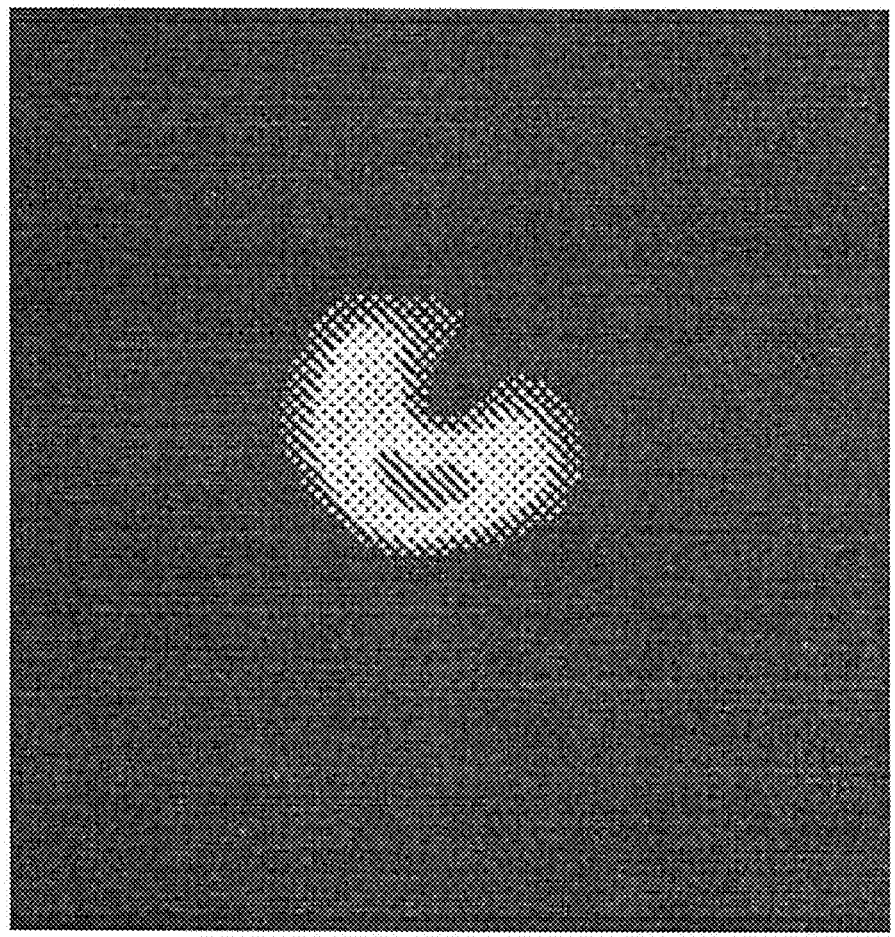
FIG. 4 is a drawing that shows a space profile for signal light according to example 1.
Figure 5:
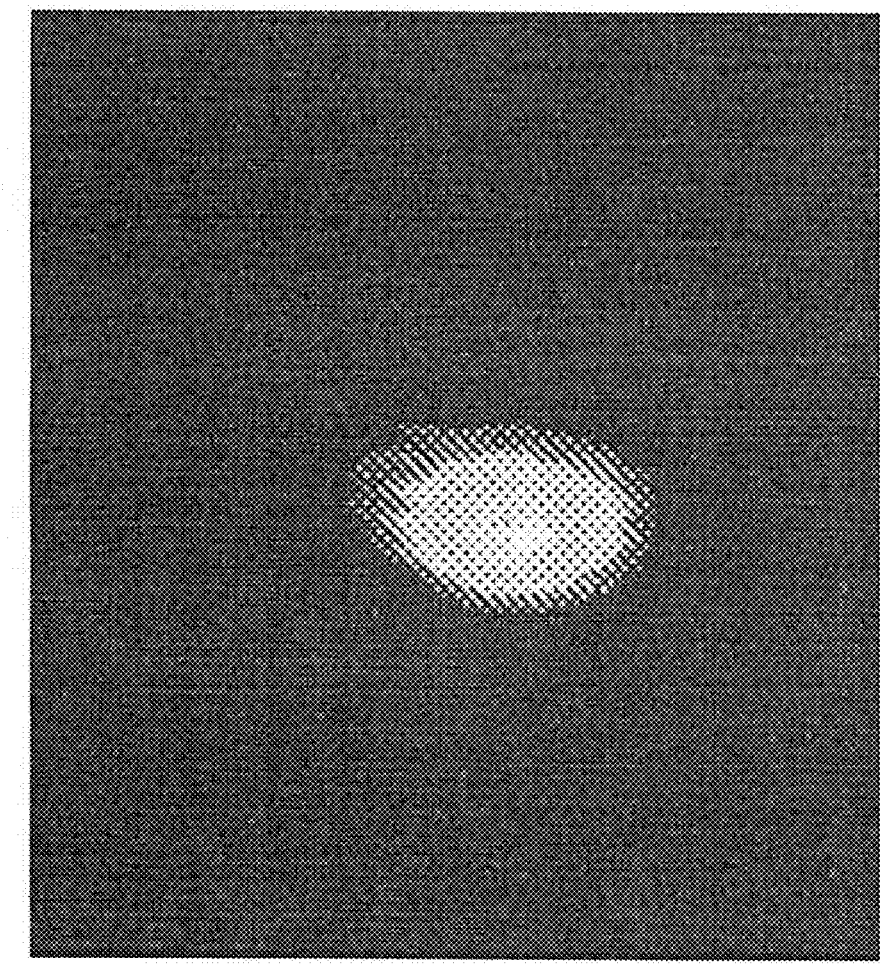
FIG. 5 is a drawing that shows a space profile for idler light according to example 1.

In the present experimental optical system S, emitted light from the optical resonance unit 4 was reflected by a mirror and then passed through a half wavelength plate. Thereafter, signal light and idler light can be respectively emitted by a first polarization beam splitter PBS. The light passing through the first polarization beam splitter is irradiated into a SHG unit 5 and an interference unit 6 described later. In FIGS. 4 and 5, space profiles for the signal light and the idler light emitted from the first polarization beam splitter are shown.

In the present experimental optical system S, a SHG unit 5 and an interference unit 6 are prepared. The SHG unit 5 is a unit for generating SHG light and can generate light with twice as many frequencies as light generated by the optical vortex generation unit 3. The SHG unit 5 includes a first lens (f=100 mm), a second lens (f=100 mm), and $KTiOPO_4$) ($\theta$=51.4° of a non-linear medium with 10 mm×10 mm×20 mm, wherein the $KTiOPO_4$ is formed between the first lens and the second lens.

In the example 1, the interference unit 6 is also prepared and is a unit that performs interference with respect to light emitted from the SHG unit 5. By the interference unit 6, quantum numbers of the signal light and the idler light can be confirmed. Furthermore, in the example 1, the interference unit 6 includes a first half mirror (50% of reflectance), a first total reflection mirror that reflects one of lights being reflected by the first half mirror, a second total reflection mirror that reflects the other of lights being transmitted by the first half mirror, and a second half mirror for adjusting light reflected by the first total reflection mirror and the second total reflection mirror.

Figure 6:
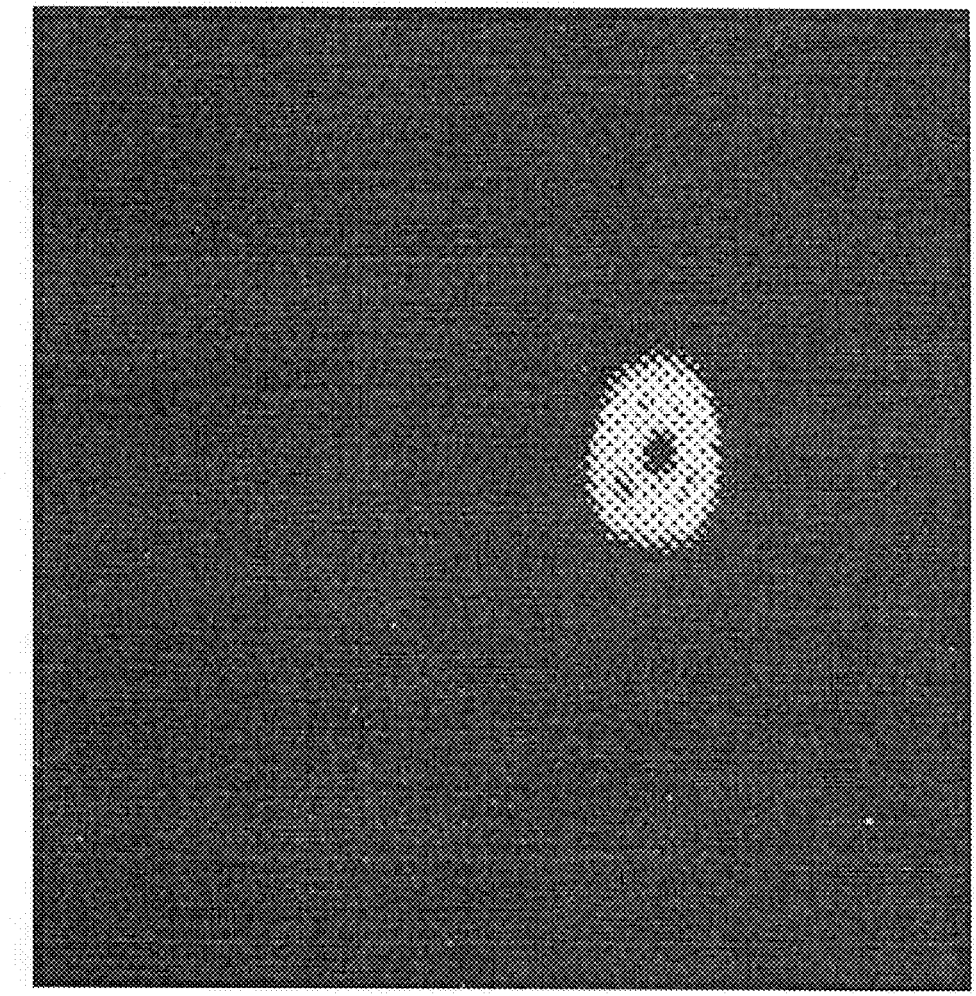
FIG. 6 is a drawing that shows a space profile for signal light (L=1) emitted from a SHG unit in example 1.
Figure 7:
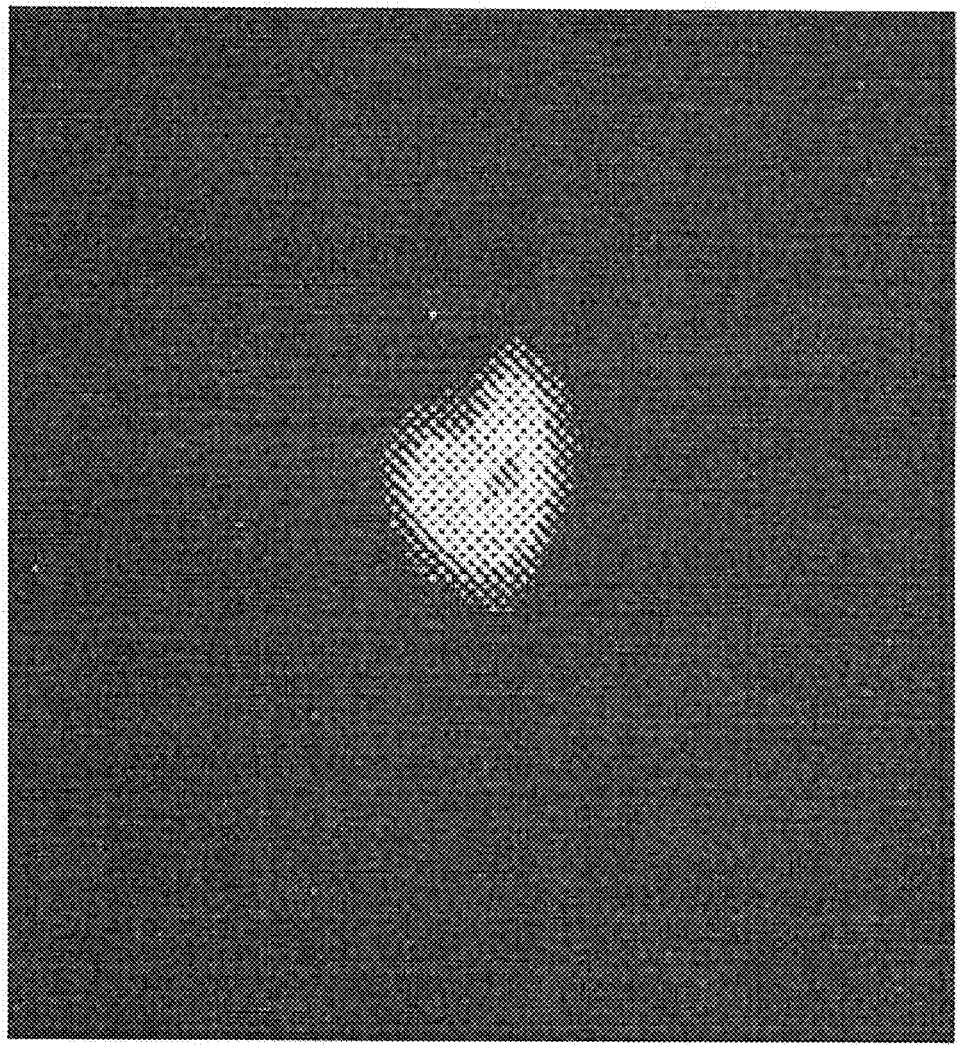
FIG. 7 is a drawing that shows a space profile for idler light (L=1) emitted from a SHG unit in example 1.
Figure 8:
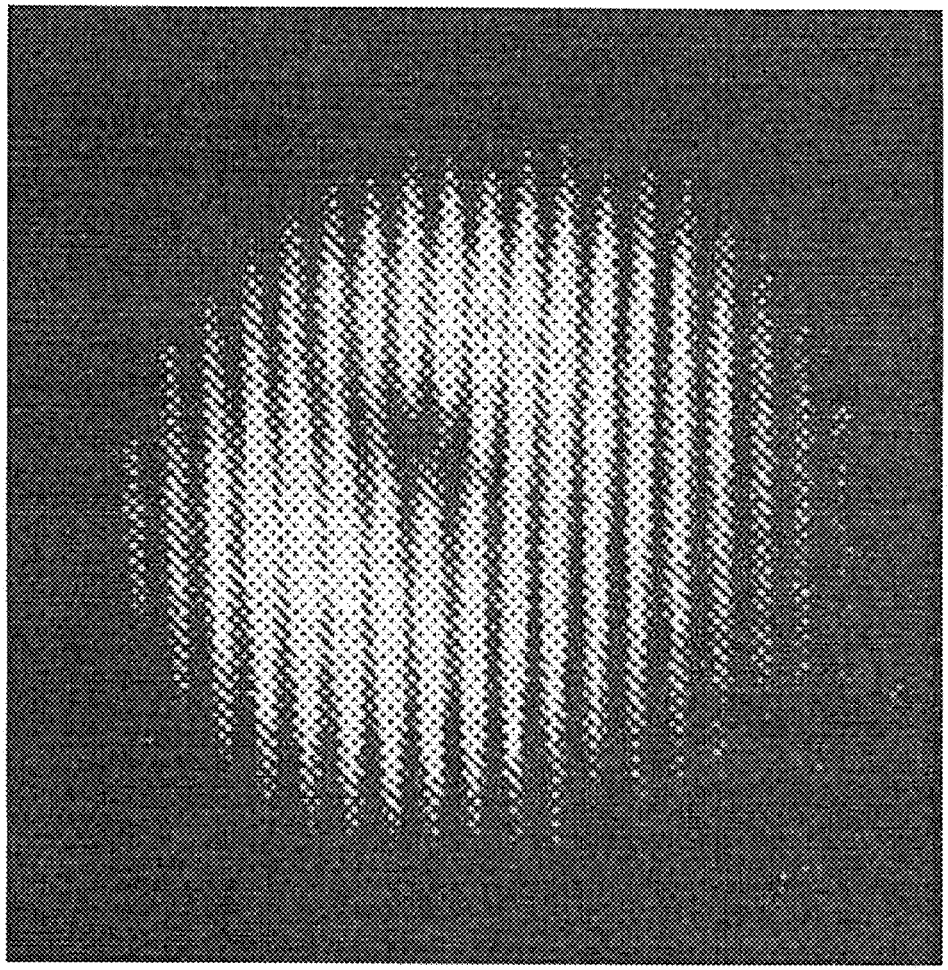
FIG. 8 is a drawing that shows a space profile for signal light emitted from an interference unit in example 1.
Figure 9:
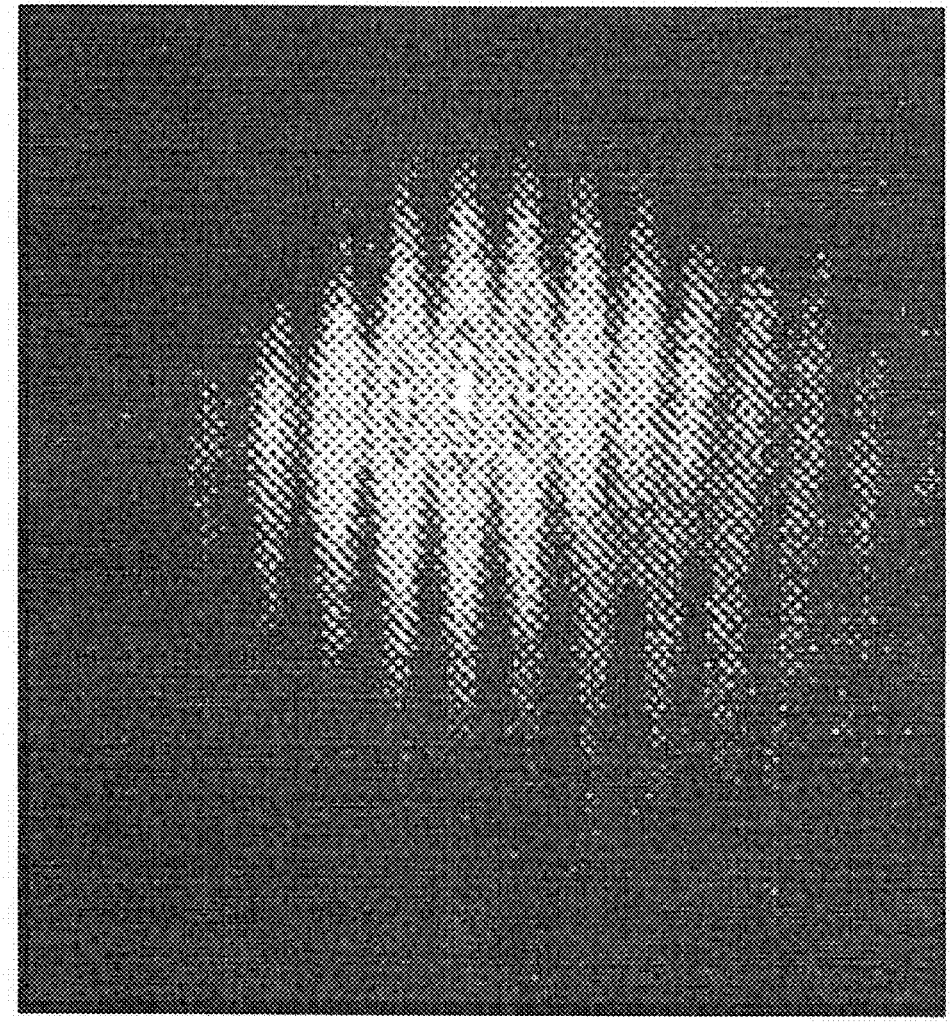
FIG. 9 is a drawing that shows a space profile for idler light emitted from an interference unit in example 1.

In the present experimental optical system S, a second polarization beam splitter PBS is formed between the SHG unit 5 and the interference unit 6, wherein one of polarized lights is irradiated into outside of the optical system S and the other of polarized lights is irradiated into the interference unit 6. In FIGS. 6 and 7, each space profile of the signal light and the idler light is shown, wherein the light is emitted from the SHG unit 5 and is not yet irradiated into the interference unit 7. In FIGS. 8 and 9, each space profile of the signal light and the idler light emitted from the interference unit 6 is shown.

As a result, it was confirmed that the signal light of ordinary ray after oscillation became 2 μm of an optical vortex having L=0.5 and a space profile. That is to say, in the example 1, it was also confirmed that an optical vortex having arbitrary quantum number was can be generated, even in a middle infrared wavelength region, because half of quantum number which excited light has can be transcribed into the signal light after wavelength conversion, no optical vortex so far having been generated in a middle infrared wavelength region.

Example 2

The example 2 is similar to the example 1 except that two pieces of helical phase plates were used for an optical vortex generation unit 3. By this configuration, it is possible to generate an excited optical vortex of L=2 of quantum number.

Figure 10:
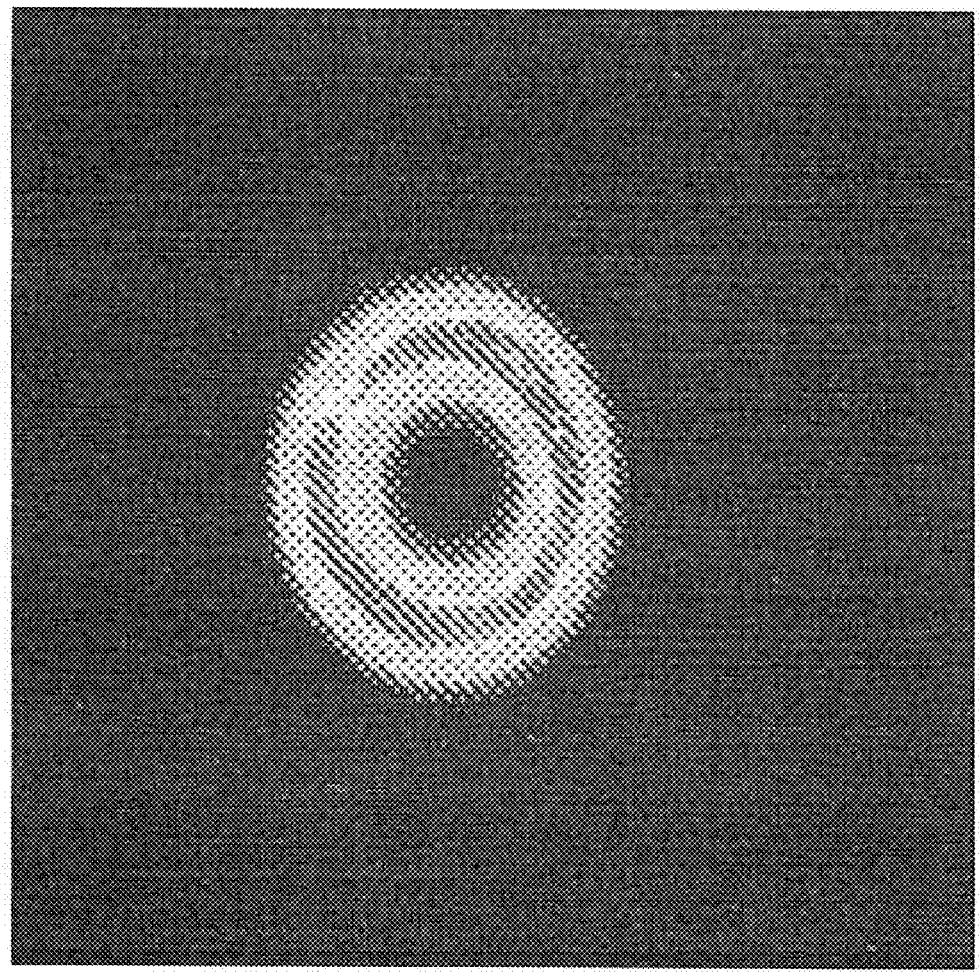
FIG. 10 is a drawing that shows a space profile for an excited optical vortex according to example 2.
Figure 11:
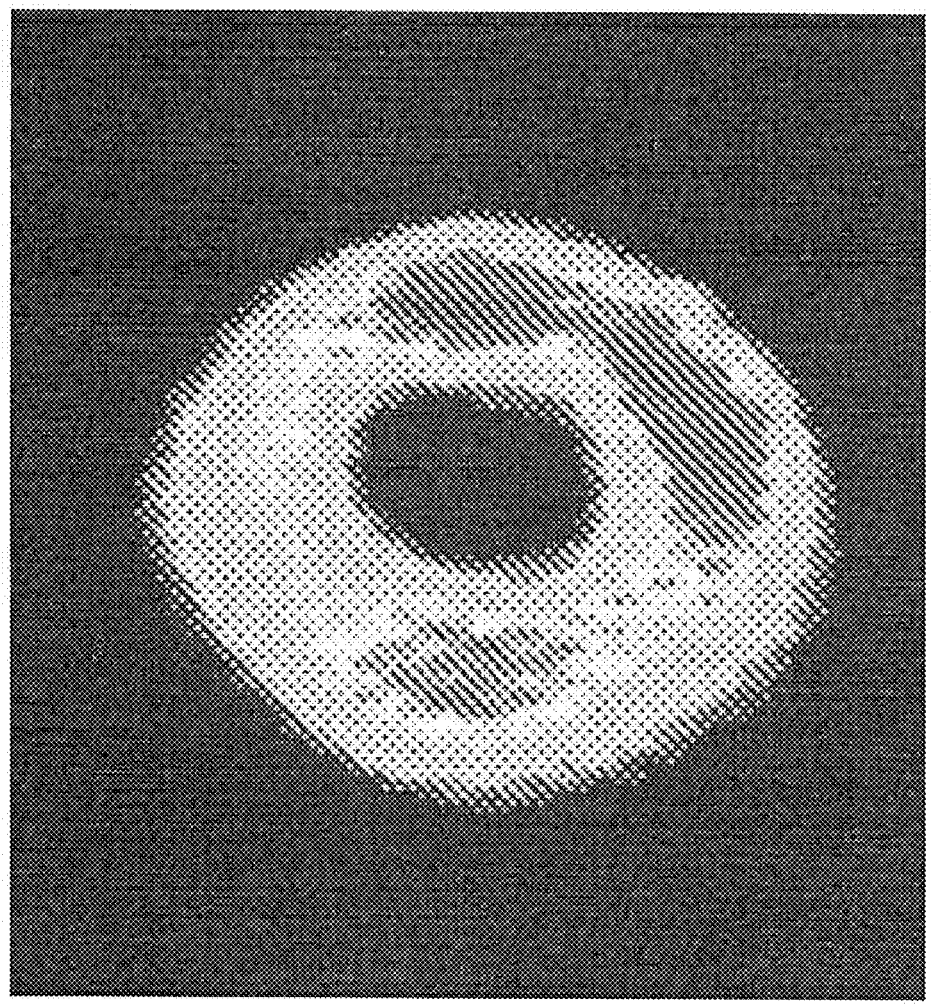
FIG. 11 is a drawing that shows a space profile for signal light according to example 2.
Figure 12:
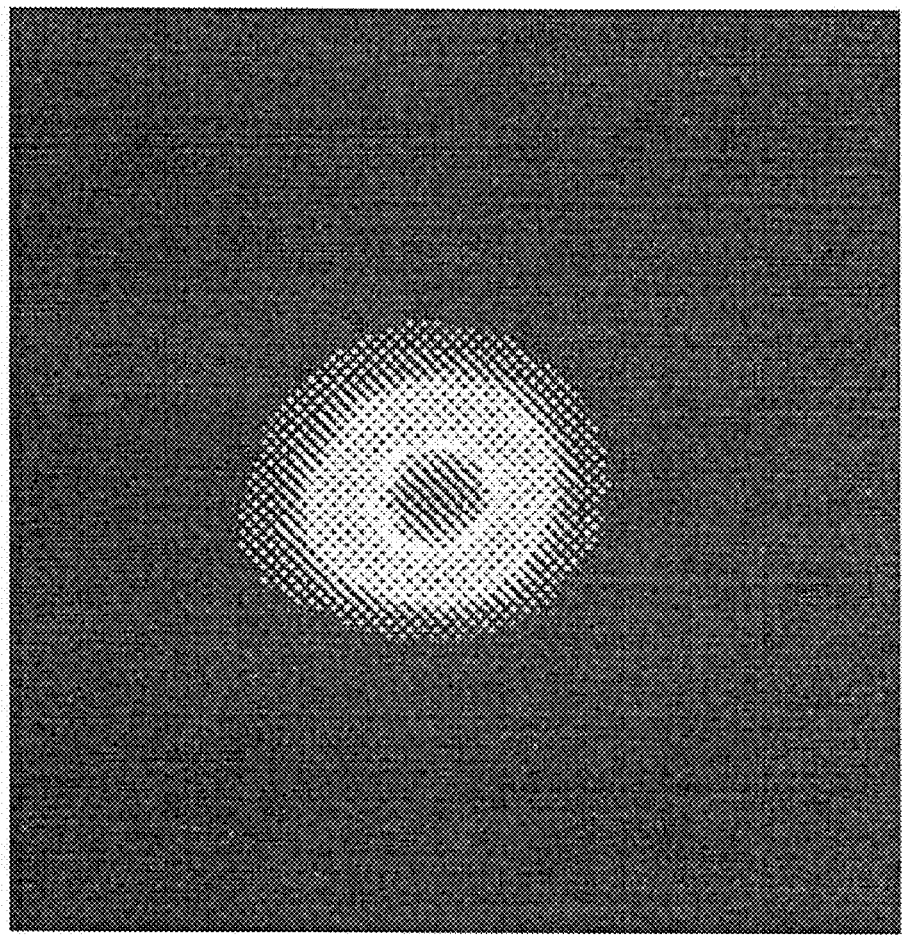
FIG. 12 is a drawing that shows a space profile for idler light according to example 2.
Figure 13:
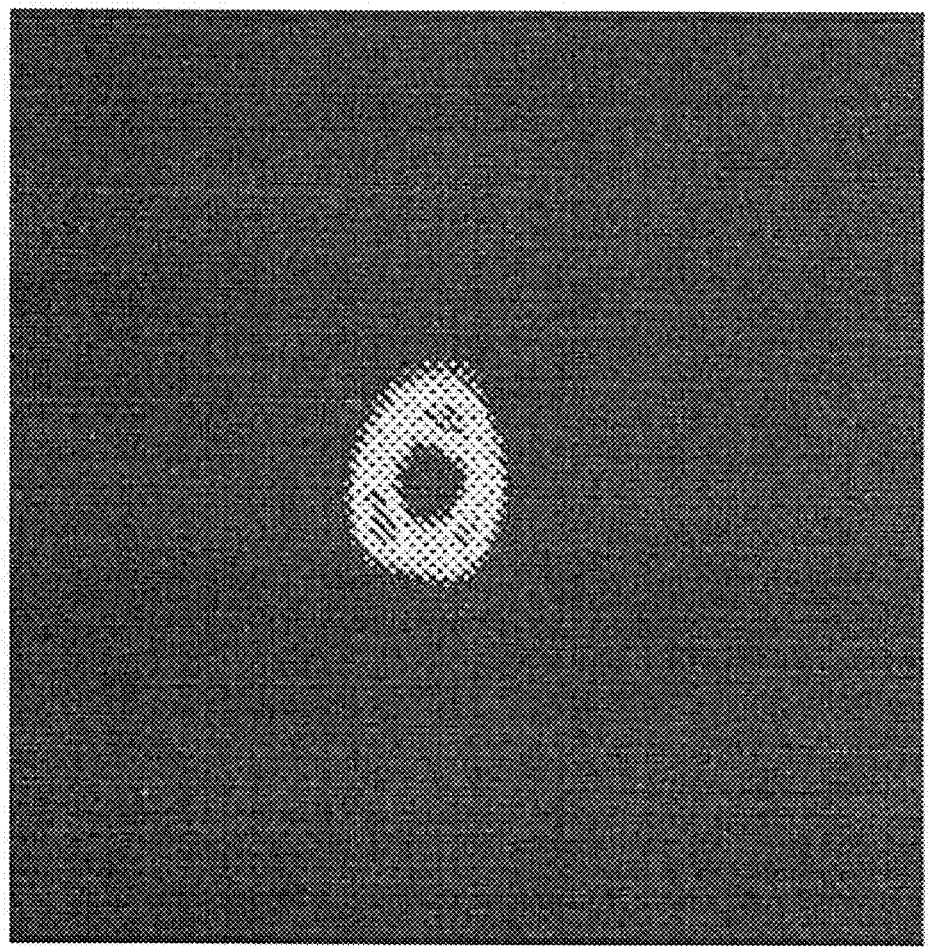
FIG. 13 is a drawing that shows a space profile for signal light (L=1) emitted from a SHG unit in example 2.
Figure 14:
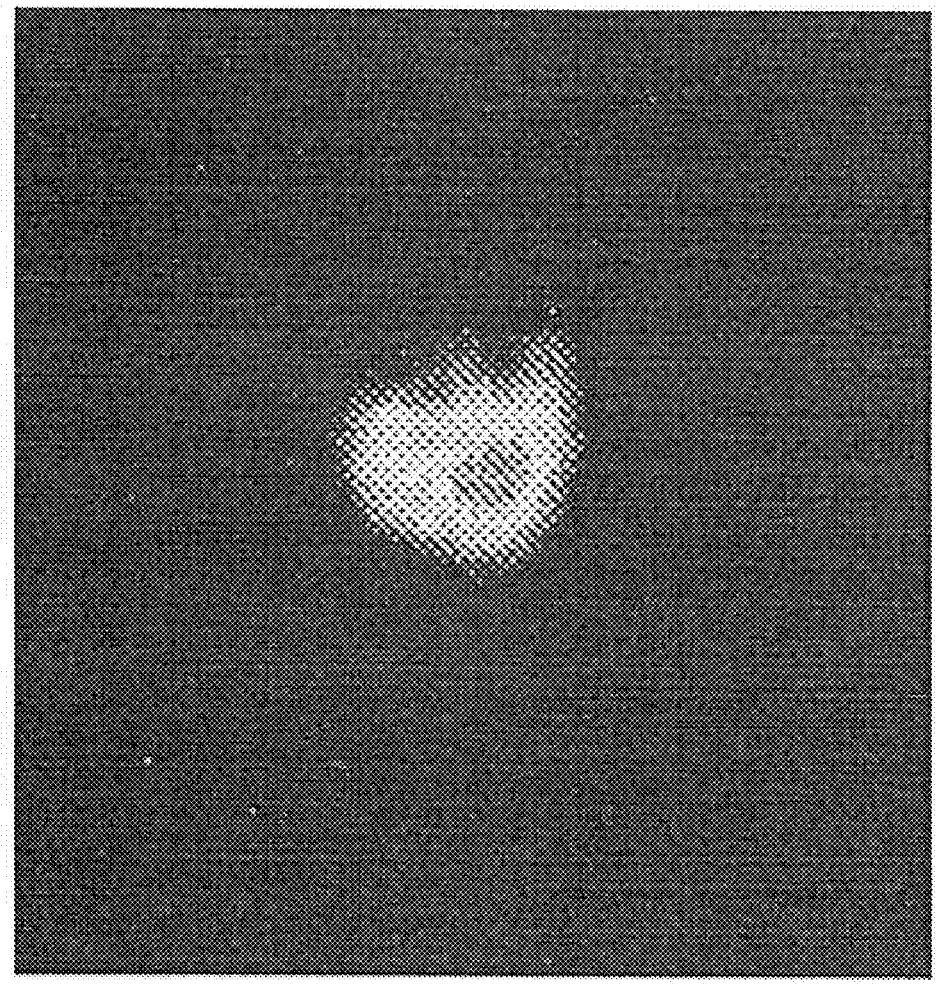
FIG. 14 is a drawing that shows a space profile for idler light (L=1) emitted from a SHG unit in example 2.
Figure 15:
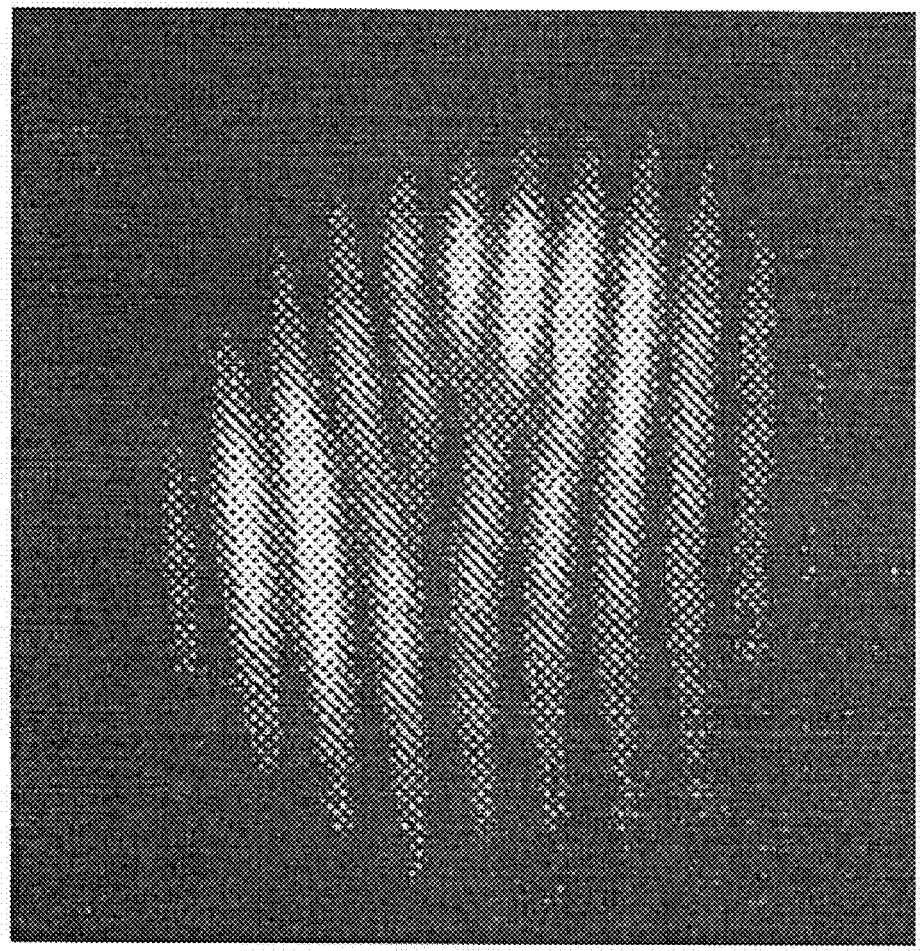
FIG. 15 is a drawing that shows a space profile for signal light emitted from an interference unit in example 2.
Figure 16:
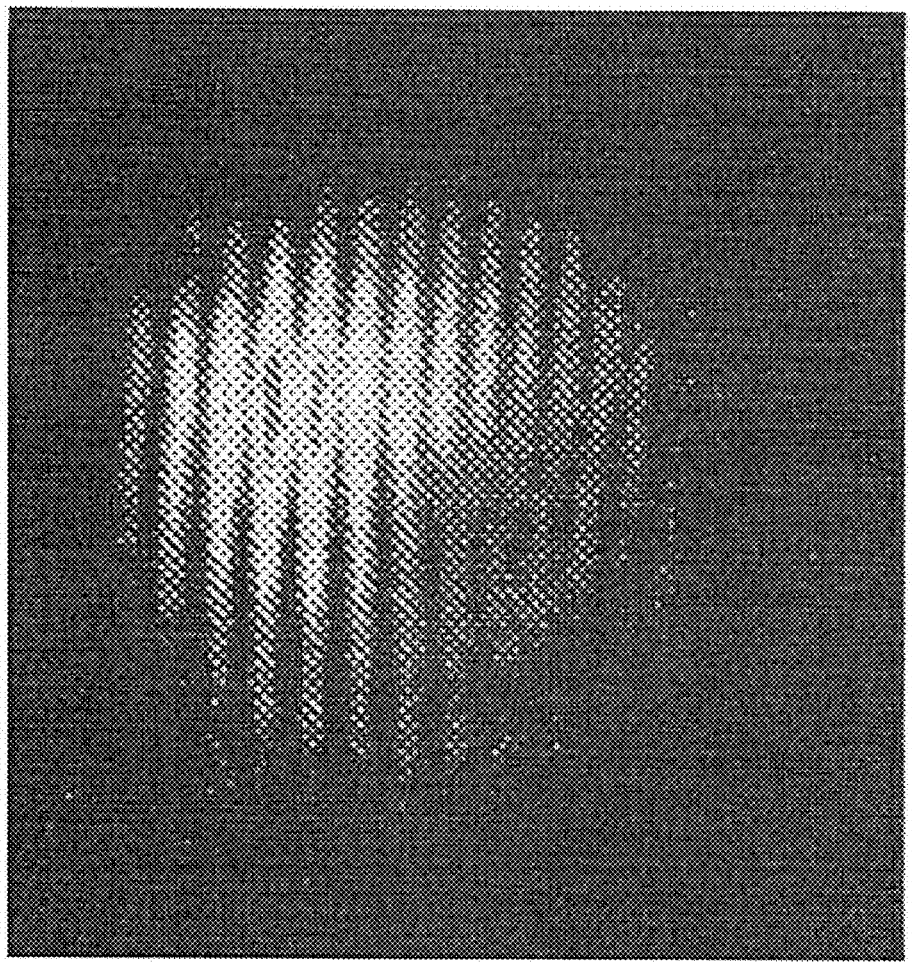
FIG. 16 is a drawing that shows a space profile for idler light emitted from an interference unit in example 2.

In FIG. 10, a space profile of the excited optical vortex before irradiation is shown. In FIGS. 11 and 12, space profiles for the signal light and the idler light emitted from the first polarization beam splitter are shown. In FIGS. 13 and 14, space profiles for the signal light and idler light emitted from the second polarization beam splitter PBS are shown. In FIGS. 15 and 16, space profiles for the signal light and the idler light emitted from the interference unit 6 are shown.

As a result, it was confirmed that an optical vortex of 2 μm of L=1 of quantum number was generated. In this case, the optical vortex was not expressed in extraordinary ray. That is to say, in the example 2, it was confirmed that an optical vortex having arbitrary quantum number was can be generated, even in a middle infrared wavelength region, because half of quantum number which excited light has can be transcribed into the signal light after wavelength conversion, no optical vortex so far having been generated in a middle infrared wavelength region.

Example 3

The example 3 was similar to the example 1 except that pulse width of laser light which the laser light source 2 generates was 25 nm, a first concave surface reflection mirror (R=2,000 mm, 98% of reflectance in 2 μm, 90% of transmittance in 1 μm) and a second flat surface reflection mirror (80% of reflectance in 2 μm, 80% of transmittance in 1 μm) were configured with opposite directions wherein distance (i.e., resonator length) therebetween was 31.2 mm, and PPSLT of a non-linear medium with 2 mm×2 mm×30 mm was formed therebetween. As a result, light of 1064 nm was divided into light of 1970 nm and light of 2313 nm.

Figure 17:
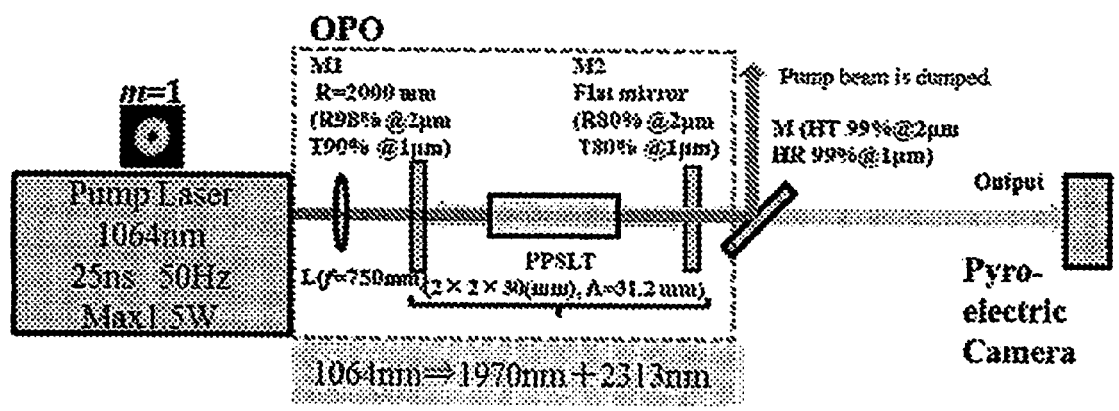
FIG. 17 is a drawing that schematically shows optical system for experiment according to an example 3.
Figure 18:
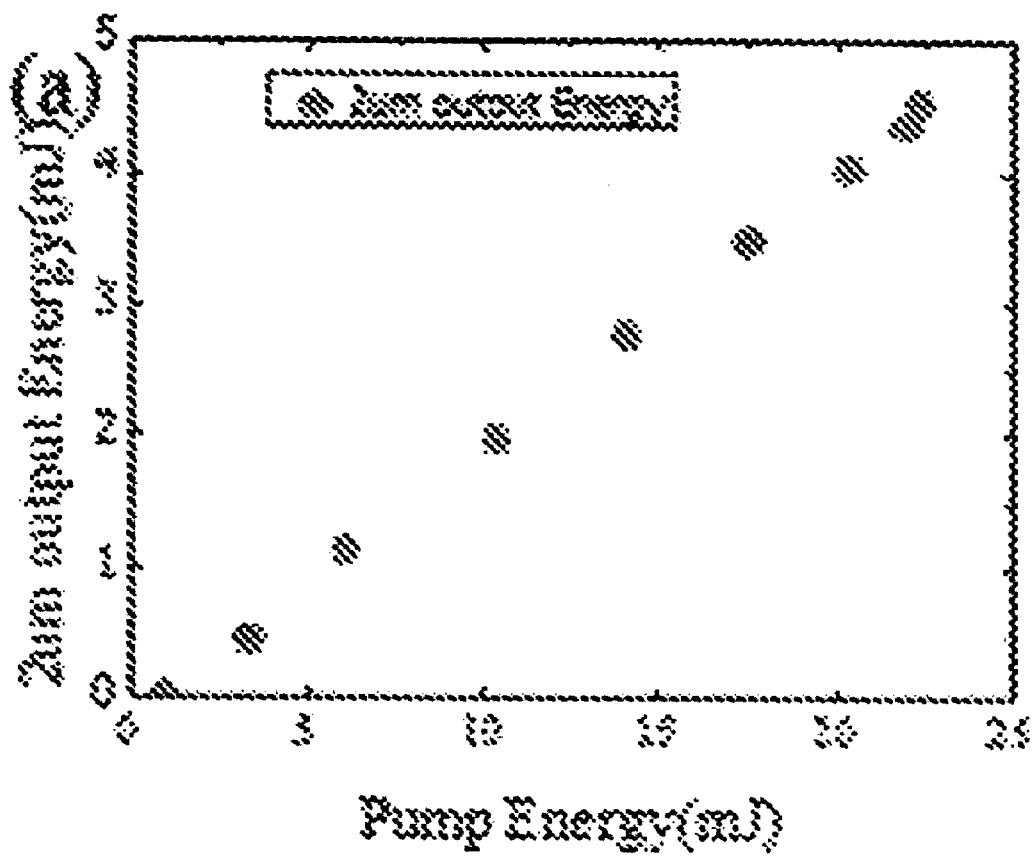
FIG. 18 is a drawing that shows input-output characteristics for an optical parametric generation according to example 3.
Figure 19:
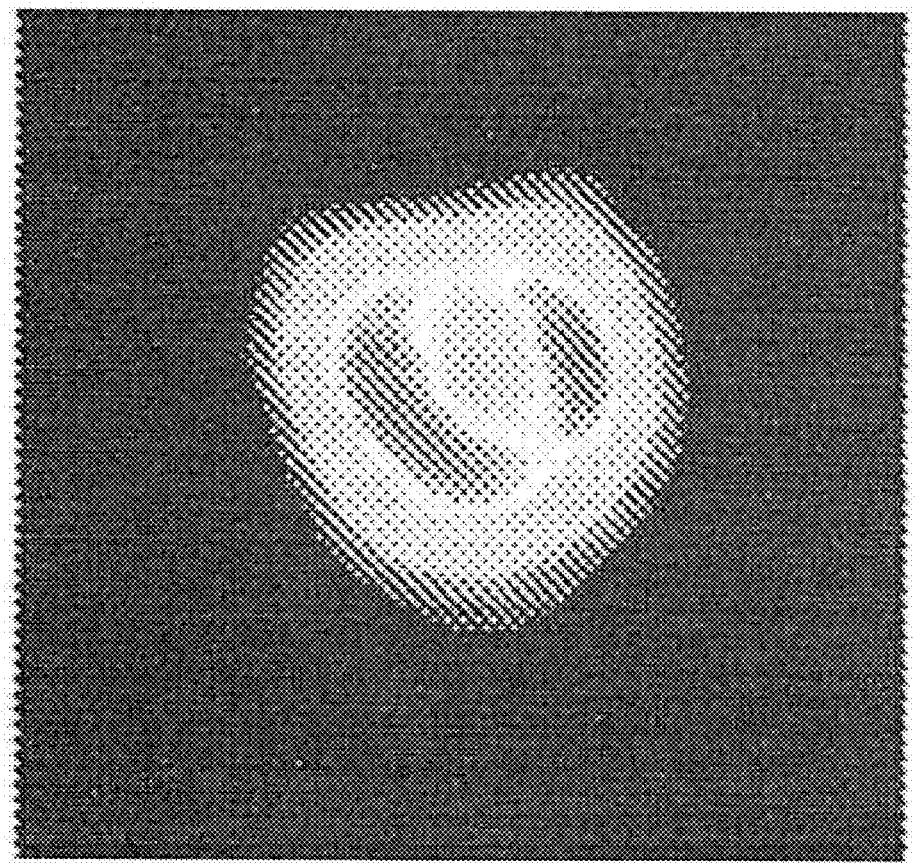
FIG. 19 is a drawing that shows a space profile for signal light and idler light according to example 3.
Figure 20:
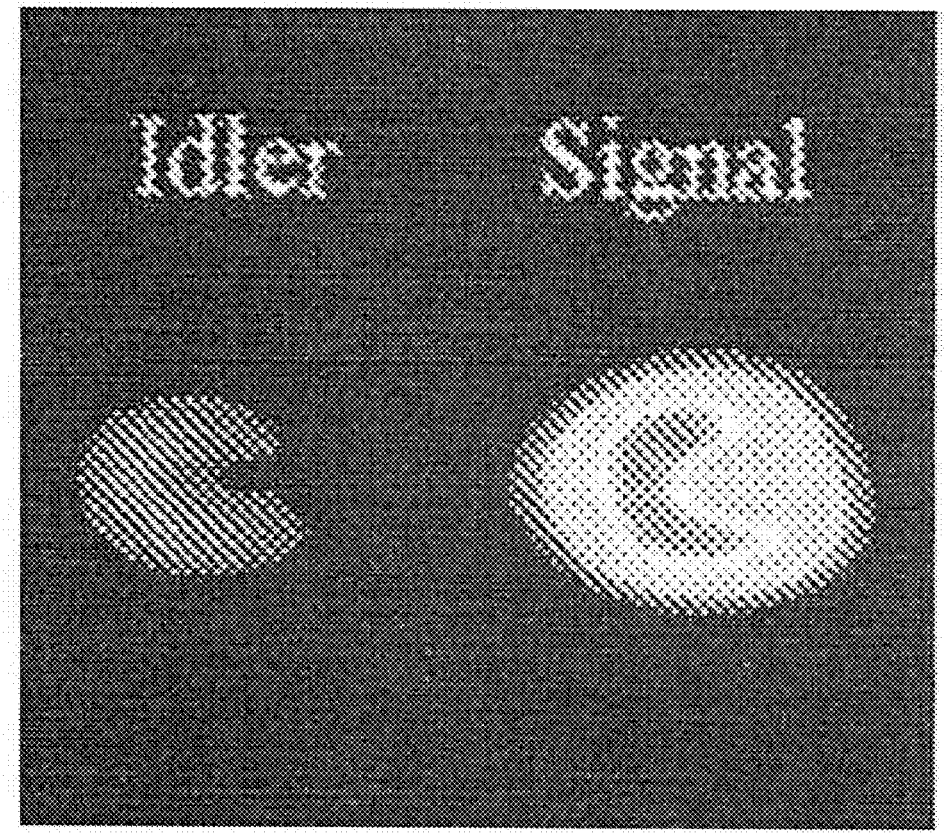
FIG. 20 is a drawing that shows a primary diffracted light pattern after signal light and idler light pass through diffraction grating according to example 3.

In FIG. 17, configuration of the optical system is shown. In FIG. 18, input-output characteristics of the optical parametric generation is shown. Moreover, in FIG. 19, space profiles of signal light and idler light emitted from the optical resonance unit are shown. In FIG. 20, primary diffracted order optical patterns after each of signal light and idler light passed through a diffraction grating are shown.

As a result, by using hologram for a primary optical vortex with respect to the signal light and the idler light, diffracted light was irradiated thereto and diffracted light was obtained, whereby asymmetry occurred in intensity distribution. That is to say, it was known that orbital angular momentums of the signal light and the idler light are non-degenerate states. However, it was confirmed that symmetry occurred in intensity distribution and orbital angular momentums are degenerate states with respect to orbital angular momentums of the signal light and the idler light shown in the example 1.

Hereinabove, according to the present invention, an optical vortex laser oscillation device can be provided, the optical vortex laser oscillation device being capable of high power and generating an optical vortex even in wide frequency range and if the optical vortex is quantum number which is not an integer. Especially, it is possible to generate multi-frequency by varying resonance condition and it is also possible to arbitrarily adjust any one of a degenerate state and a non-degenerate state.

INDUSTRIAL APPLICABILITY

The present invention is industrially applicable as an optical vortex oscillation device and a method for generating an optical vortex laser.

What is claimed is:

1. A method for oscillating an optical vortex laser comprises: irradiating an optical vortex of pulse excitation into an optical parametric oscillation system; generating a plurality of coherent optical vortices; and varying quantum number of orbital angular momentum to perform frequency conversion.

2. The method according to claim 1, wherein the optical parametric oscillation system comprises a resonator that includes a non-linear medium and a pair of resonator mirrors sandwiching the non-linear medium.

3. The method according to claim 2, wherein radius of curvature for the resonator mirrors is five times larger than resonator length formed by the pair of resonator mirrors.

4. The method according to claim 1, wherein the pair of resonator mirrors is a parallel flat plate.

5. The method according to claim 1, wherein a degenerate state of the quantum number of angular momentum is varied by changing resonance condition in the resonator.

6. The method according to claim 1, wherein the quantum number of orbital angular momentum is a non-degenerate state.

7. The method according to claim 1, wherein multi-frequency is generated by generating the plurality of coherent optical vortices.

8. The method according to claim 7, wherein difference frequency is generated.

9. The method according to claim 2, wherein the non-linear medium is rotated.

10. The method according to claim 2, wherein temperature for the non-linear medium is changed.

11. The method according to claim 2, wherein the non-linear medium includes at least any one of $KTiOPO_4$, periodically polarization-reversed $LiNbO_3$, and periodically polarization-reversed $LiTaO_3$.

12. An optical vortex laser oscillation device comprises:
a laser light source for generating laser light of pulse excitation;
an optical vortex generation unit for generating an excited optical vortex based on the laser light generated by the laser light source; and an optical parametric oscillation system in which a plurality of coherent optical vortices are generated based on the excited optical vortex generated by the optical vortex generation unit and quantum number of orbital angular momentum is changed by performing frequency conversion.

13. The optical vortex laser oscillation device according to claim 12, wherein the optical parametric oscillation system comprises a resonator that includes a non-linear medium and a pair of resonator mirrors sandwiching the non-liner medium.

14. The optical vortex laser oscillation device according to claim 13, wherein radius of curvature for the resonator mirrors is five times larger than resonator length formed by the pair of resonator mirrors.

15. The optical vortex laser oscillation device according to claim 12, wherein the pair of resonator mirrors is a parallel flat plate.

16. The optical vortex laser oscillation device according to claim 12, wherein a degenerate state of the quantum number of angular momentum is varied by changing resonance condition in the resonator.

17. The optical vortex laser oscillation device according to claim 12, wherein the quantum number of orbital angular momentum is a non-degenerate state.

18. The optical vortex laser oscillation device according to claim 12, wherein multi-frequency is generated by generating the plurality of coherent optical vortices.

19. The optical vortex laser oscillation device according to claim 18, wherein difference frequency is generated.

20. The optical vortex laser oscillation device according to claim 13, wherein the non-linear medium is rotated.

21. The optical vortex laser oscillation device according to claim 13, wherein temperature for the non-linear medium is changed.

22. The optical vortex laser oscillation device according to claim 13, wherein the non-linear medium includes at least any one of $KTiOPO_4$, periodically polarization-reversed $LiNbO_3$, and periodically polarization-reversed $LiTaO_3$.

23. A laser oscillation device comprises:
a laser light source for generating laser light;
an optical vortex generation unit for generating an excited optical vortex based on the laser light generated by the laser light source; and,
an optical resonance unit for resonating the excited optical vortex generated by the optical vortex generation unit and dividing the excited optical vortex into signal light and idler light.

24. The laser oscillation device according to claim 23, wherein the optical resonance unit includes a non-linear medium and a pair of resonator mirrors sandwiching the non-liner medium.

25. The laser oscillation device according to claim 24, wherein radius of curvature for the resonator mirrors is five times larger than resonator length formed by the pair of resonator mirrors.

26. The laser oscillation device according to claim 23, wherein a ratio of photon energy for the idler light with respect to photon energy for the signal light is 0.8 or more and 1.2 or less.

27. The laser oscillation device according to claim 24, wherein the non-linear medium includes at least any one of $KTiOPO_4$, periodically polarization-reversed $LiNbO_3$, and periodically polarization-reversed $LiTaO_3$.

* * * * *